United States Patent
Hunter et al.

(10) Patent No.: US 9,503,613 B1
(45) Date of Patent: Nov. 22, 2016

(54) SCANNING PREVIOUS PRINTING PASSES FOR REGISTRATION OF SUBSEQUENT PRINTING PASSES

(71) Applicant: Xerox Corporation, Norwalk, CT (US)

(72) Inventors: Jonathan B. Hunter, Marion, NY (US); David R. Kretschmann, Webster, NY (US); Ronald W. Bogert, Webster, NY (US); Nicholas Harrison Hainline, Webster, NY (US); Theodore Gram, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/950,091

(22) Filed: Nov. 24, 2015

(51) Int. Cl.
  *H04N 1/50* (2006.01)
  *G06K 15/02* (2006.01)
  *H04N 1/00* (2006.01)

(52) U.S. Cl.
  CPC .......... *H04N 1/508* (2013.01); *G06K 15/1873* (2013.01); *H04N 1/00015* (2013.01); *H04N 1/00039* (2013.01); *H04N 1/00087* (2013.01); *H04N 2201/0082* (2013.01)

(58) Field of Classification Search
  USPC ........................................................ 358/1.5
  See application file for complete search history.

(56) References Cited

U.S. PATENT DOCUMENTS

| | | |
|---|---|---|
| 3,701,464 A | 10/1972 | Crum |
| 3,915,090 A | 10/1975 | Horst et al. |
| 4,025,025 A | 5/1977 | Bartel et al. |
| RE32,967 E | 6/1989 | St. John et al. |
| 5,355,152 A | 10/1994 | Porter et al. |
| 5,587,728 A | 12/1996 | Edgar |
| 6,335,978 B1 | 1/2002 | Moscato et al. |
| 6,345,877 B2 | 2/2002 | Soto et al. |
| 6,714,748 B1 | 3/2004 | Nakayasu et al. |
| 6,938,970 B2 | 9/2005 | Van den Bergen |
| 8,757,756 B2 | 6/2014 | Ashida |
| 8,767,220 B2 | 7/2014 | Hunter et al. |
| 2009/0293750 A1* | 12/2009 | Haenni ................ B41J 3/42 101/484 |
| 2011/0122455 A1* | 5/2011 | Elliot ............... H04N 1/00002 358/406 |
| 2011/0141521 A1* | 6/2011 | Qiao ................ H04N 1/32112 358/1.16 |

FOREIGN PATENT DOCUMENTS

DE     EP0729846     1/2000

* cited by examiner

*Primary Examiner* — Jerome Grant, II
(74) *Attorney, Agent, or Firm* — Gibb & Riley, LLC (57) ABSTRACT

Methods and devices print markings on an item in a first printing pass, using intended locations for the markings, to produce initial printed marks. Such methods and devices further scan the item after the first printing pass to detect actual printed locations of the initial printed marks. These methods and devices also compare the actual printed locations to the intended locations to identify the printing registration variation. Thus, such methods and devices change the intended locations for the markings based on the printing registration variation to generate corrected locations for the markings; and then reprint the markings directly on the initial printed marks a second time on the item in a second printing pass using the corrected locations for the markings, using the marking device.

20 Claims, 8 Drawing Sheets

SCANNING PREVIOUS PRINTING PASSES FOR REGISTRATION OF SUBSEQUENT PRINTING PASSES

BACKGROUND

Systems and methods herein generally relate to systems and methods that print multiple passes on an item, and more particularly to systems and methods that register different printing passes.

It is not uncommon to print a pattern on media multiple times in different printing passes. For example, white toner can be used to increase image quality when printing on non-white substrates. On these types of media used, for example, in the packaging business, it can be useful to print white first, then lay down color toners (e.g., cyan, magenta, yellow, black (CMYK)) on top of the white printing for more accurate color rendition. Additionally, given the relatively low mass that is printed in a single pass, it may be advantageous to print multiple layers of white prior to printing CMYK.

One issue that limits the effectiveness of multi-pass printing is Image on Paper (IOP) registration variation that can create fuzzy edges on characters, patches, or images printed multiple times.

SUMMARY

Various printing apparatuses disclosed herein include, among other components, a processor, a marking device operatively (meaning directly or indirectly) connected to the processor, a scanning device operatively connected to the processor, etc. The marking device prints markings on an item in a first printing pass using intended locations for the markings to produce initial printed marks. The scanning device scans the item after the first printing pass to detect the actual printed locations of the initial printed marks. For example, the actual printed locations of the initial printed marks can be measured relative to edges of the item.

The processor then compares the actual printed locations to the intended locations to identify the printing registration variation that occurred in the first printing pass. In one example, the processor can identify such printing registration variation by identifying skew, process direction position, and cross-process direction position based on the actual printed locations of the initial printed marks; and by calculating process direction magnification and cross-process direction magnification based on known magnification values related to the marking device printing markings.

The processor then changes the intended locations for the markings based on the printing registration variation to generate corrected locations for the markings. The printing registration variation quantifies the difference between the actual printed locations and the intended locations for the markings; and the corrected locations for the markings are different from the intended locations for the markings by such a difference. The marking device then reprints the same markings directly on the initial printed marks a second time on the item in a second printing pass using the corrected locations for the markings.

Also, the scanning device can be wider than the item; and can be, for example, a full-with array (FWA) scanner. This allows the marking device to print alignment marks (that are distinct from the initial printed marks) in intended alignment mark locations on the item. Thus, the processor can also compare the locations of the alignment marks to the intended alignment mark locations to further identify the printing registration variation. In such a situation, the markings are printed by the marking device within a final print area, and the alignment marks are printed outside the final print area, in a trim area. The trim area is removed from the final print area after printing on the item is complete.

Exemplary methods herein print markings on an item in a first printing pass, using intended locations for the markings, to produce initial printed marks (using a marking device of a printing apparatus). Such methods further scan the item after the first printing pass to detect actual printed locations of the initial printed marks, using a scanning device of the printing apparatus. Such actual printed locations of the initial printed marks can be measured relative to edges of the item.

These methods also compare the actual printed locations to the intended locations to identify the printing registration variation, using a processor of the printing apparatus. Then, such methods change the intended locations for the markings based on the printing registration variation to generate corrected locations for the markings, using the processor. The printing registration variation is the difference between the actual printed locations and the intended locations for the markings; and the corrected locations for the markings are different from the intended locations for the markings by such a difference. Such methods then reprint the markings directly on the initial printed marks a second time on the item in a second printing pass using the corrected locations for the markings, using the marking device.

Additionally, the scanning device can have a width that is wider than the item (e.g., can be a full-with array (FWA) scanner. This allows such methods to print alignment marks (that are distinct from the initial printed marks) in intended alignment mark locations on the item, using the marking device. Then, such methods can compare the locations of the alignment marks to the intended alignment mark locations to further identify the printing registration variation using the processor. The markings are printed by the marking device within a final print area; and the alignment marks are outside the final print area, in a trim area. The trim area is removed from the final print area after printing on the item is complete.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, one issue that limits the effectiveness of multi-pass printing is IOP registration variation that can create fuzzy edges on characters, patches, or images printed multiple times. Therefore, the systems and methods herein provide a closed loop image on paper control specific to implementing multi-pass printing. The systems and methods herein can utilize a print engine, a full width array sensor for image capture, and image processing to analyze the image captures.

Regarding IOP registration variation creating fuzzy edges on characters, different printing passes of identical size/shape overlaid at slight offsets effectively blurs the edges of the shape. This deficiency is exacerbated if one wishes to print white only in areas where characters or images will be printed (complete overlay printing). The IOP variation is caused by several factors such as media conditions (weight, size, and moisture content), environmental shifts, and general machine variation. This, coupled with the current architecture of open loop IOP setup, leads to inevitable shifts in IOP registration over the course of printing.

To the contrary, the closed loop system disclosed herein tightly controls and accounts for these drifts in IOP. There are typically 6 degrees of freedom that are corrected for in IOP. These are described in Table 1:

TABLE 1

| IOP DOE | Description | Control Actuator |
| --- | --- | --- |
| Process Magnification | Shrink or Expansion of the image in the process direction | CHIPER electronic image scaling |
| Cross-Process Magnification | Shrink or Expansion of the image in the cross process direction | CHIPER electronic image scaling |
| Process Position | Positioning of the image relative to the page's lead edge | Timing control of the process position of the page |
| Cross-Process Position | Positioning of the image relative to the page's outboard edge | Start of Scan delay or advance |
| Skew | Rotation of the image relative to the page | Steering algorithms in the registration system |
| Squareness | Distortion of the image in a parallelogram fashion | ROS de-skew mechanism to "square" the scan line to the belt motion |

For overall IOP setup, each of the 6 degrees of freedom should be accounted for. However, with some systems and methods described herein, it can be assumed that squareness does not change appreciably from one pass of a sheet through transfer, to the next pass of that same sheet. Additionally, while both process and cross-process magnification will change with each pass through the fuser, that amount is fairly constant, and can be calculated in the initial existing setup. This leaves only skew, process, and cross-process positions to deal with.

By placing a full width array scanning device in the registration system, the systems and methods herein can detect the position of the image relative to the reference edges (lead and outboard) of the page to calculate actual image position. Once the position is known, the control actuators can be adjusted in the registration system prior to transfer. Thus, with systems and methods herein, the image is scanned directly from the printed paper, in real time, and actuations are made on a sheet by sheet basis to align individual passes of marking material transferred to the sheet.

More specifically, the systems and methods herein initially processed an image using an image processor (e.g., printer digital front end (DFE)) to isolate image boundaries (areas where the image and blank space are adjacent). Then, knowing where the image is supposed to be place relative to the paper, the next step is to print the image, and then measure the actual image placement. By placing a full width array in the paper path, image captures can be made of entire pages as the paper passes below the sensor. Thus, the scanner can have a measurement width wider than the largest media width, and the ability to sample at a frequency great enough to provide suitable resolution for image measurement.

Once the image of the previously printed sheet is captured by the scanner, a similar image processing routine that ran on the image file, can be run on the image capture. This routine is slightly modified to filter measurement noise, and be robust against non-perfect image boundaries.

Figure 1:
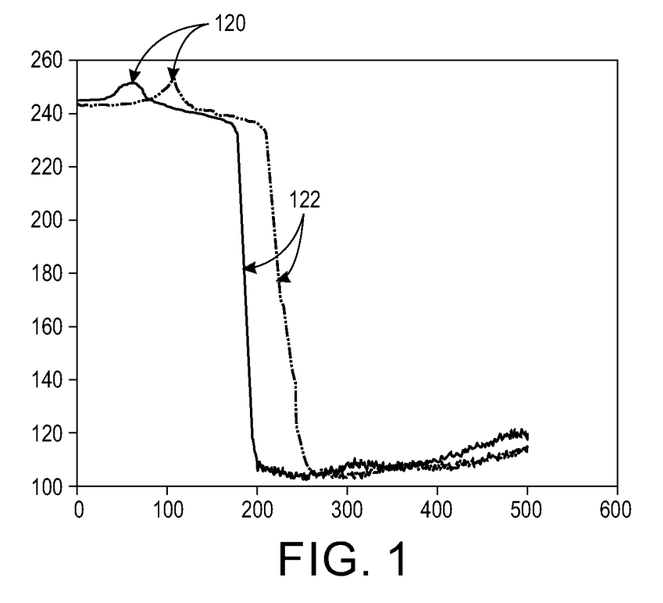
FIG. 1 is a graph showing operations performed by systems and methods herein.

In one example, the systems and methods herein create a profile of the image by averaging or taking the median of the image along one dimension. For example, the same image can be scanned at two slightly different rotations on the platen, and the averages of the two images across one of the paper edges and image edges is shown in FIG. 1. In FIG. 1, the paper edges are the blips 120 in the profiles at approximately pixel 60 and 110. The size of the blip 120 can be greatly enhanced by providing some contrast between the background and the paper edge. As shown, one blip is sharper, and this indicates that the paper edge is squarer to the scan. For a FWA sensing a piece of paper, this is indicative of skew in the paper going under the sensor.

Also, in FIG. 1, the much larger drops 122 in the signal (pixels 200 and 250) are due to the edge of the image on the paper. In this case, one image is sharper, so the edge of the image 122 is squarer to the scan that the other. Consequently, the systems and methods herein can conclude that the image is skewed on the paper. While it may not be practical to rotate the image in this manner and scan multiple times, it is possible to calculate simple averages along the paper edge and image edge to extract the same information about the rotation of the paper verses the rotation of the image edge.

Figure 2:
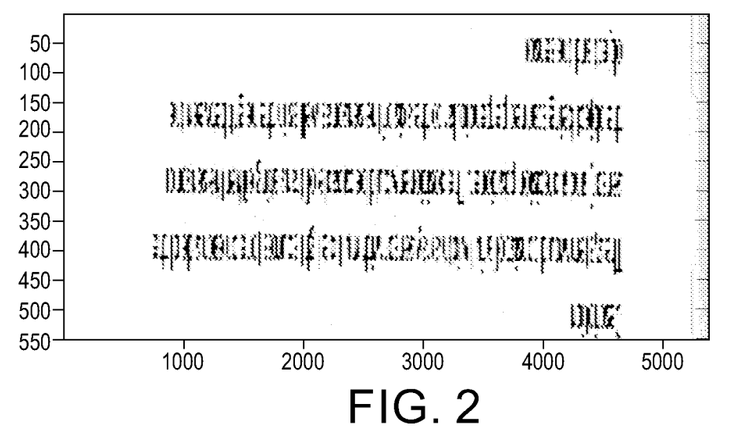
FIG. 2 is a graph showing operations performed by systems and methods herein.
Figure 3:
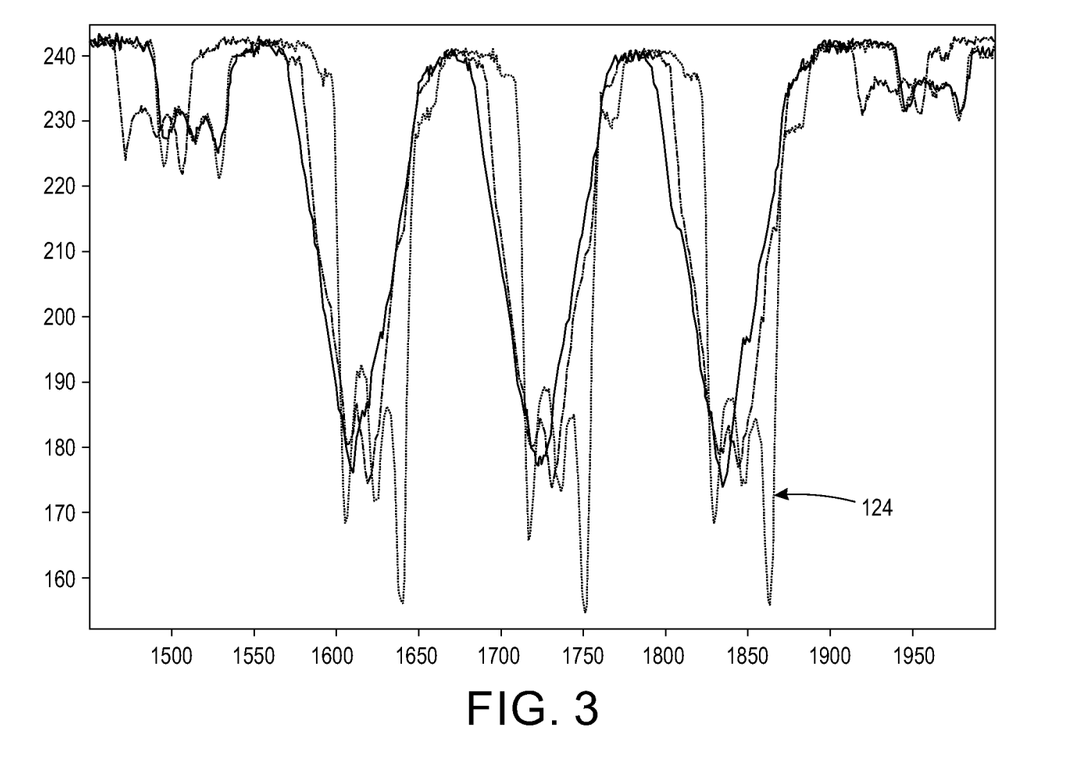
FIG. 3 is a graph showing operations performed by systems and methods herein.

Other types of images also contain significant orientational cues that can be extracted from simplified processing of the image. For example a piece of image (partly collapsed in the horizontal dimension) is shown in FIG. 2. Looking at the profile averaging in the horizontal dimension enables a clear distinction between an image that is rotated properly and one that is skewed, as show in FIG. 3. More specifically, one of the profiles 124 has much larger blips, which is indicative of text that is properly square to the scan, whereas the other profiles are skewed.

Most documents contain features such as text and images that are square to the rendered image. It is very rare to find features that are at very small angles over significant portions of the image. Consequently, it is feasible to look for such edges in documents and try to align the media to the image appropriately. A similar technique is used herein for analyzing magnification (absolute as well as relative). The Fourier transform peaks will offset from each other, showing an overall magnification shift. This is useful when dealing with paper shrinkage though the fuser. A final image processing technique used herein derives information based on the halftone screen. While the locations of halftoned portions of an image are known, the angles of the halftone dots and their frequency are known as long as the imaging mode is known. Thus, the angles and positions of the peaks can be used to extract angular deviations as well as shrinkage of the image relative to the assumed halftone screen orientations and size.

Regardless of the technique used, the systems and methods herein compare the input image file to the measured output image capture. If the measurements are made in a relative sense, the comparisons are also relative. If they are made in an absolute sense, then the comparisons can also be absolute measurements. Where this becomes useful is in deciding the image capture architecture. If actual measurements are used, a method to reflex scan the image will be used (ex, place a high frequency encoder wheel in the media path directly adjacent to the FWA). Making relative measurements is therefore simpler to implement, and allows for much of the functionality of the routine.

Depending on the limitations in the system, this processing described herein can be run on every image, at image intervals, or even once per some action event (ex, once per cycle up). These measurements are also used in rolling average method to filter and increase accuracy.

Additionally, in the packaging arena, media is always trimmed prior to folding/gluing and, therefore, the systems and methods herein can use alignment markings outside the print area. For example, a job can be designed with predefined cursors (bullseye fiducials, chevrons, or other) to locate against the paper edges, knowing that they will be trimmed off the final product in subsequent operations. Such fiducials are typically used in downstream automated trim operations.

With such a closed loop approach, the systems and methods herein provide consistent measurement target printed on the page, eliminating the need for a separate setup routine. Further, systems and methods herein provide real time correction on actual images, rather than diagnostic, setup, or test images. This allows the systems and methods herein to correct for machine drift, environmental drift, and difference due to image content.

Figure 4:
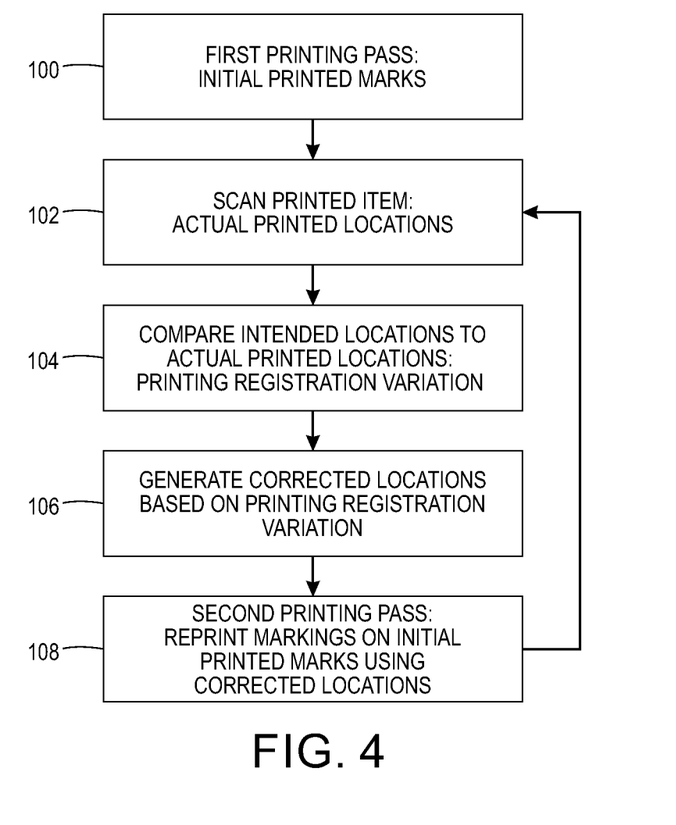
FIG. 4 is a flow diagram of various methods herein.

FIG. 4 is flowchart illustrating exemplary methods herein, and FIGS. 5-11 illustrate operations performed by the methods shown in FIG. 4. In item 100, in FIG. 4, these methods print markings on an item in a first printing pass, using intended locations for the markings, to produce initial printed marks (using a marking device 240 of a printing apparatus, shown in FIG. 12, and discussed in greater detail below).

Figure 5:
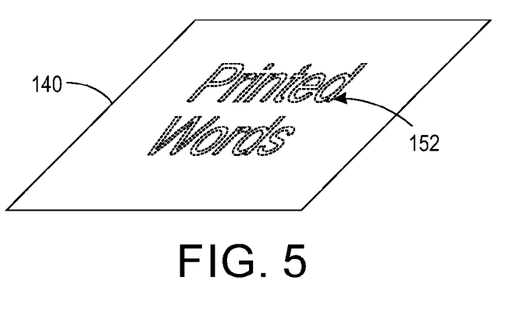
FIG. 5 is a schematic diagram illustrating operations of devices and methods herein.
Figure 6:
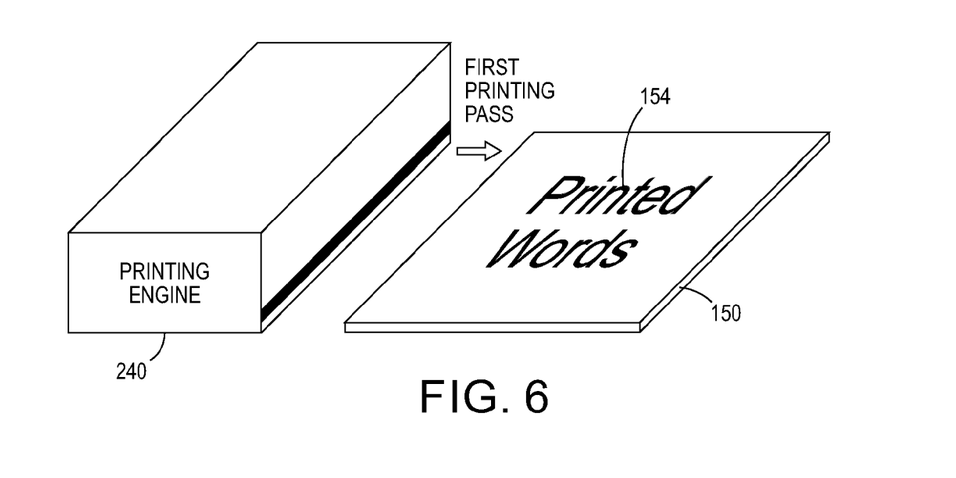
FIG. 6 is a schematic diagram illustrating operations of devices and methods herein.

FIGS. 5 and 6 also illustrates the processing performed in item 100, where FIG. 5 illustrates the intended locations 152 in an electronic document 140 where the initial printed marks (such as printed words) should be made on an item 150. As would be understood by one ordinarily skilled in the art, item 150 can be anything that can be printed on, including sheets of media (paper, transparencies, card stock, etc.), cardboard, wood, metal, plastics, etc.; and the printed marks can be anything capable of being printed (in monochrome or color) including numbers, letters, shapes, logos, etc. FIG. 6 shows the initial printed marks 154 printed on the item 150 by any form of printing engine 240 (that is discussed in greater detail below with respect to FIG. 12).

Figure 7:
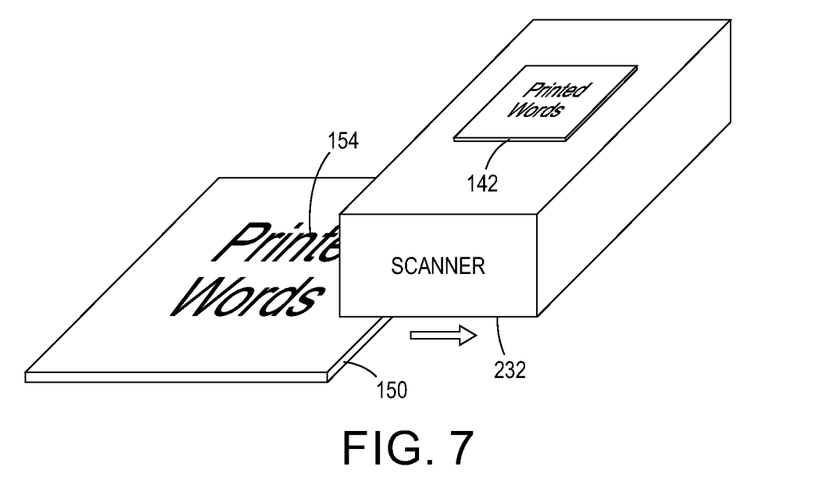
FIG. 7 is a schematic diagram illustrating operations of devices and methods herein.

In item 102 in FIG. 4 (and FIG. 7) such methods further scan the item 150 after the first printing pass using a scanning device 232 of the printing apparatus (that is discussed in greater detail below with respect to FIG. 12). As shown in FIG. 7, this scanning process produces an electronic scanned image 142 of the printed item 150. This allows the methods herein to detect actual printed locations of the initial printed marks 154 within the electronic scanned image 142. For example, such actual printed locations of the initial printed marks 154 can be measured relative to edges of the item 150, can be pixel measurements, or measures relative to any other reference elements.

As shown in item 104 in FIG. 4 (and FIG. 8) these methods also compare the actual printed locations of the initial printed marks 154 to the intended locations 152 to identify the printing registration variation 156, using a processor 224 of the printing apparatus (also discussed in greater detail below with respect to FIG. 12).

Figure 8:
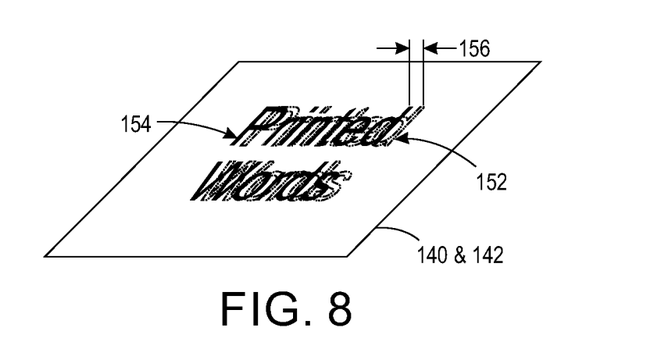
FIG. 8 is a schematic diagram illustrating operations of devices and methods herein.
Figure 9:
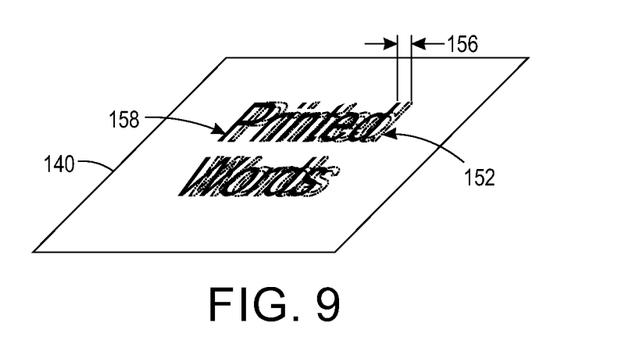
FIG. 9 is a schematic diagram illustrating operations of devices and methods herein.
Figure 10:
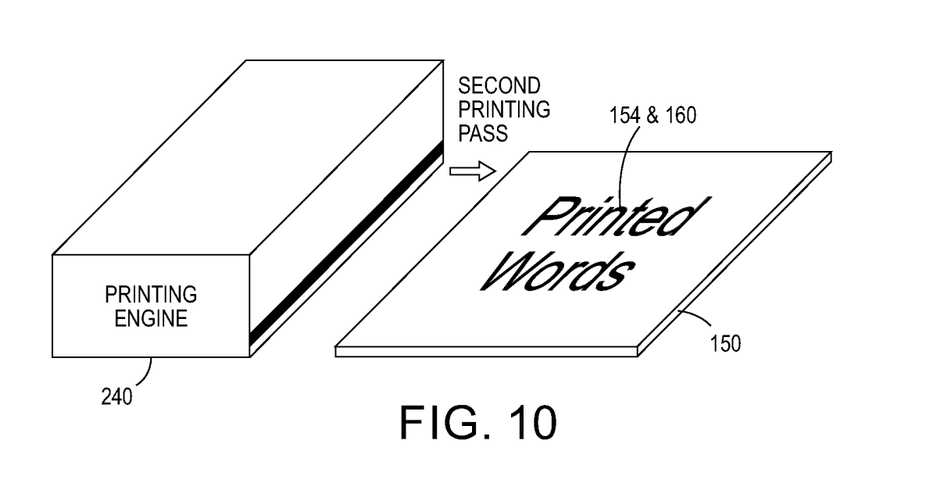
FIG. 10 is a schematic diagram illustrating operations of devices and methods herein.

Thus, in item 104, these methods compare the likeness or darkness (of any color characteristic) of pixels within the electronic scanned image 142 with the bitmap pixels produced from the electronic document 140, and in this way compare or conceptually overlay the electronic document 140 on the electronic scanned image 142 (as conceptually shown in FIG. 8) to identify the printing registration variation 156. As shown in FIG. 8, the printing registration variation 156 is the difference between the actual printed locations and the intended locations 152 for the markings when the electronic document 140 is conceptually overlaid on the electronic scanned image 142.

As shown in item 106 in FIG. 4 (and FIG. 9) such methods change the intended locations 152 for the markings within the electronic document 140 based on the printing registration variation 156 to generate corrected locations 158 for the markings, using the processor 224. These corrected locations 158 for the markings are different from the intended locations 152 for the markings by the printing registration variation 156.

Next, as shown in item 108 in FIG. 4 (and FIG. 10) these methods reprint the same markings from the electronic document 140 directly on the initial printed marks 154 a second time on the item 150 in a second printing pass using the corrected locations 158 for the markings to place additional marking material 160 (e.g., second pass printed marks) perfectly aligned on the initial printed marks 154, using the marking device 240. Subsequently, as shown by the arrow looping back to item 102, further additional printing passes (e.g., third, fourth, etc.) can be performed until the desired affect is achieved.

In other words, the different printing passes described above attempt to print the exact same printing (e.g., same shape, same color, same location, same size, etc.) on the item 150 in different printing passes. A complete printing pass occurs when an item receives printing and exits the marking device 240 (or exits the printer 204) and is later returned to the marking device 240 to have the exact same process repeated. Therefore, individual printing passes are different than separate internal marking device operations that sequentially print different colors (on the print media or an intermediate transfer belt) using different print heads at different locations within the marking device, because different printing passes fully complete the printing process on the item and then return the item for an additional complete printing process in subsequent passes. Each printing pass may include receiving marking material from many different print heads, and subsequent marking operations (such as fusing, etc.).

However, as noted above, various factors can cause the printing of the second printing pass to not be aligned with the first printing pass. In view of this, the systems and methods herein scan the printing after the first printing pass has been completed and compensate for any difference between location where the initial printed marks 154 were intended to be printed, and the actual printed locations where the initial printed marks 154 were actually printed on the item 150.

Therefore, by scanning the previously printed sheet before performing the second printing pass, the systems and methods herein can adjust the location where the exact same items are printed in the second printing pass (160) to ensure that the second printing pass prints the exact same items 160 directly where the initial printed marks 154 were printed on the item 150. This prevents any visual distortions (fuzzy edges on characters, patches, or images printed multiple times, etc.) that could occur if there was not correct registration between the first and second printing passes.

Figure 11:
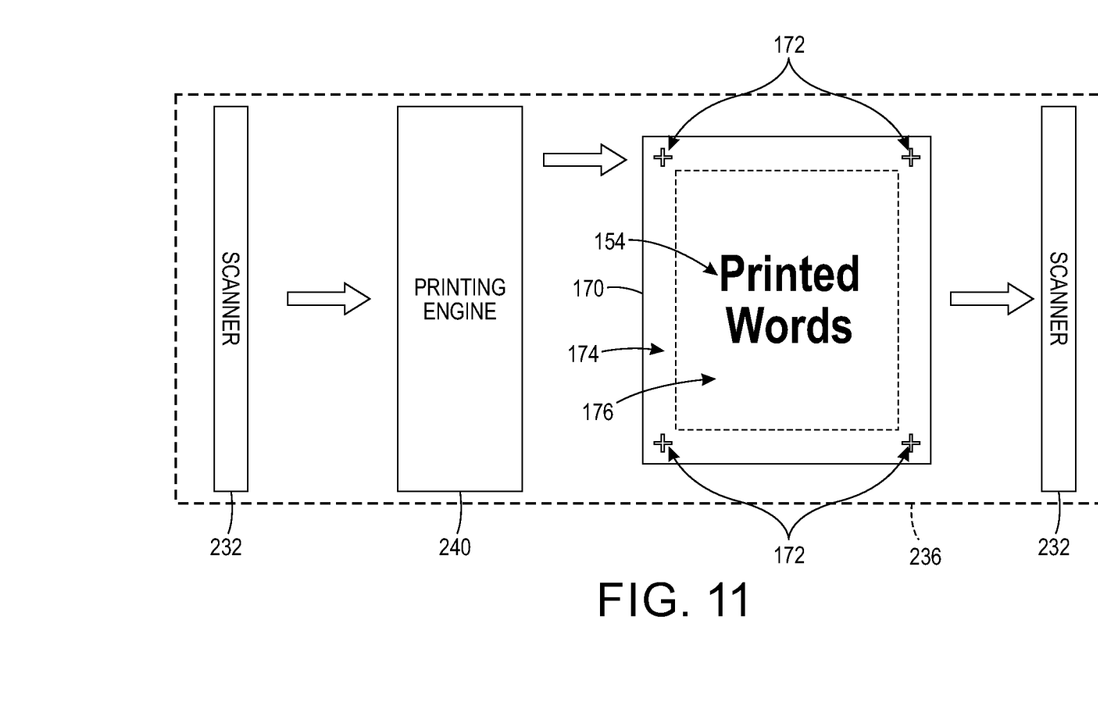
FIG. 11 is a schematic diagram illustrating operations of devices and methods herein.

Additionally, as shown in FIG. 11, the scanning device 232 can have a width that is wider than an item 170 (e.g., can be a full-with array (FWA) scanner). This allows such methods to print alignment marks 172 (that are distinct from the initial printed marks 154) in intended alignment mark locations on the item 170, using the marking device 240. Then, such methods can compare the locations of the alignment marks 172 to the intended alignment mark locations to further identify the printing registration variation 156 using the processor 224. The initial printed marks 154 are printed by the marking device 240 within a final print area 176; and the alignment marks 172 are printed outside the final print area 176, in a trim area 174. The trim area 174 is removed from the final print area 176 after printing on the item 170 is complete.

FIG. 11 also illustrates that multiple scanners 232 can be used, that the scanner 232 can be positioned within the paper path 236, and that the scanner 232 can be positioned before or after the printing engine 240 (relative to the processing direction shown by the block arrows in FIG. 11).

Figure 12:
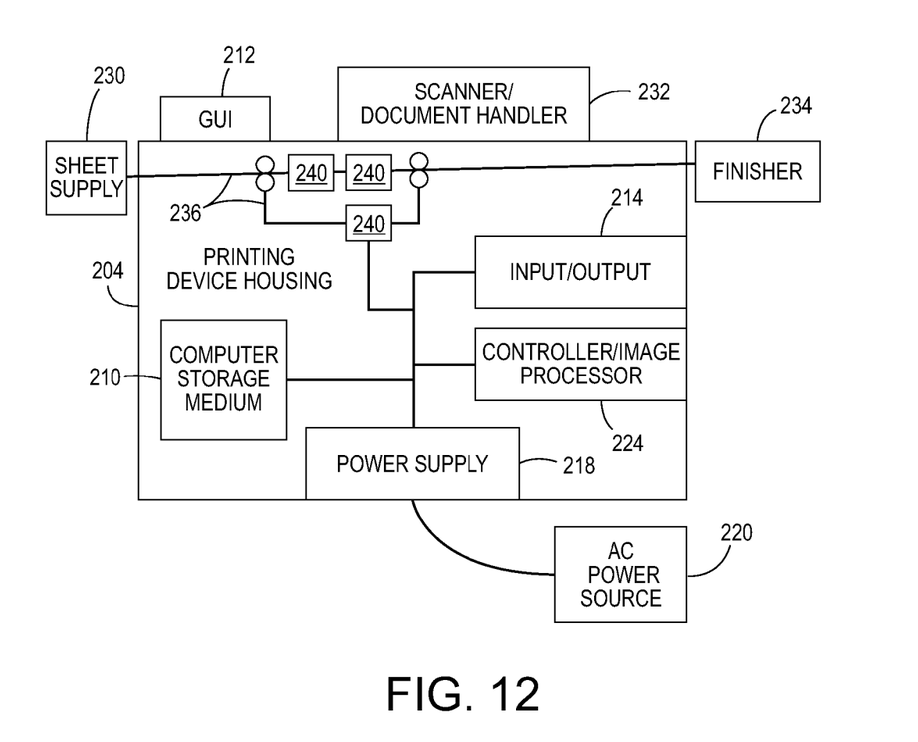
FIG. 12 is a schematic diagram illustrating devices herein.

FIG. 12 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the computerized device. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 12, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

Therefore, as shown above, various printing apparatuses 204 disclosed herein include, among other components, a processor 224, a marking device 240 operatively (meaning directly or indirectly) connected to the processor 224, a scanning device 232 operatively connected to the processor 224, etc. The marking device 240 automatically prints markings on an item in a first printing pass using intended locations for the markings to produce initial printed marks. The scanning device 232 automatically scans the item after the first printing pass to detect the actual printed locations of the initial printed marks. For example, the actual printed locations of the initial printed marks can be measured relative to edges of the item.

The processor 224 then automatically compares the actual printed locations to the intended locations to identify the printing registration variation that occurred in the first printing pass. In one example, the processor 224 can automatically identify such printing registration variation by identifying skew, process direction position, and cross-process direction position based on the actual printed locations of the initial printed marks; and by automatically calculating process direction magnification and cross-process direction magnification based on known magnification values related to the marking device 240 printing markings.

The processor 224 then automatically changes the intended locations for the markings based on the printing registration variation to automatically generate corrected locations for the markings. The printing registration variation quantifies the difference between the actual printed locations and the intended locations for the markings; and the corrected locations for the markings are different from the intended locations for the markings by such a difference.

The marking device 240 then automatically reprints the same markings directly on the initial printed marks a second time on the item in a second printing pass using the corrected locations for the markings.

Also, the scanning device 232 can be wider than the item; and can be, for example, a full-with array (FWA) scanner. This allows the marking device 240 to automatically print alignment marks (that are distinct from the initial printed marks) in intended alignment mark locations on the item.

Thus, the processor 224 can also automatically compare the locations of the alignment marks to the intended alignment mark locations to further identify the printing registration variation. In such a situation, the markings are printed by the marking device 240 within a final print area, and the alignment marks are printed outside the final print area, in a trim area. The trim area is removed from the final print area after printing on the item is complete.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:
a processor,
a marking device operatively connected to said processor; and
a scanning device operatively connected to said processor,
said marking device printing markings on an item in a first printing pass using intended locations for said markings to produce initial printed marks,
said scanning device scanning said item after said first printing pass to detect actual printed locations of said initial printed marks,
said processor comparing said actual printed locations to said intended locations to identify a printing registration variation,
said processor changing said intended locations for said markings based on said printing registration variation to generate corrected locations for said markings, and
said marking device reprinting said markings directly on said initial printed marks a second time on said item in a second printing pass using said corrected locations for said markings.

2. The printing apparatus according to claim 1, said printing registration variation comprising a first difference between said actual printed locations and said intended locations for said markings, and
said corrected locations for said markings being different from said intended locations for said markings by said first difference.

3. The printing apparatus according to claim 1, said scanning device having a width that is wider than said item.

4. The printing apparatus according to claim 1, said scanning device comprising a full-with array (FWA) scanner.

5. The printing apparatus according to claim 1, said actual printed locations of said initial printed marks being relative to edges of said item.

6. The printing apparatus according to claim 1, said marking device printing alignment marks in intended alignment mark locations on said item,
said initial printed marks being distinct from said alignment marks, and
said processor comparing said locations of said alignment marks to said intended alignment mark locations to further identify said printing registration variation.

7. The printing apparatus according to claim 6, said initial printed marks being printed by said marking device within a final print area,
said alignment marks being outside said final print area in a trim area, and
said trim area being removed from said final print area after printing on said item is complete.

8. A printing apparatus comprising:
a processor,
a marking device operatively connected to said processor; and
a scanning device operatively connected to said processor,
said marking device printing markings on an item in a first printing pass using intended locations for said markings to produce initial printed marks, said scanning device scanning said item after said first printing pass to detect actual printed locations of said initial printed marks, said processor comparing said actual printed locations to said intended locations to identify a printing registration variation by:

identifying skew, process direction position, and cross-process direction position based on said actual printed locations of said initial printed marks; and calculating process direction magnification and cross-process direction magnification based on known magnification values related to said marking device printing markings, said processor changing said intended locations for said markings based on said printing registration variation to generate corrected locations for said markings, and said marking device reprinting said markings directly on said initial printed marks a second time on said item in a second printing pass using said corrected locations for said markings.

9. The printing apparatus according to claim 8, said printing registration variation comprising a first difference between said actual printed locations and said intended locations for said markings, and said corrected locations for said markings being different from said intended locations for said markings by said first difference.

10. The printing apparatus according to claim 8, said scanning device having a width that is wider than said item.

11. The printing apparatus according to claim 8, said scanning device comprising a full-with array (FWA) scanner.

12. The printing apparatus according to claim 8, said actual printed locations of said initial printed marks being relative to edges of said item.

13. The printing apparatus according to claim 8, said marking device printing alignment marks in intended alignment mark locations on said item, said initial printed marks being distinct from said alignment marks, and said processor comparing said locations of said alignment marks to said intended alignment mark locations to further identify said printing registration variation.

14. The printing apparatus according to claim 13, said initial printed marks being printed by said marking device within a final print area, said alignment marks being outside said final print area in a trim area, and said trim area being removed from said final print area after printing on said item is complete.

15. A method comprising:

printing markings on an item in a first printing pass using intended locations for said markings to produce initial printed marks, using a marking device of a printing apparatus;

scanning said item after said first printing pass to detect actual printed locations of said initial printed marks, using a scanning device of said printing apparatus;

comparing said actual printed locations to said intended locations to identify a printing registration variation, using a processor of said printing apparatus;

changing said intended locations for said markings based on said printing registration variation to generate corrected locations for said markings, using said processor; and reprinting said markings directly on said initial printed marks a second time on said item in a second printing pass using said corrected locations for said markings, using said marking device.

16. The method according to claim 15, said printing registration variation comprising a first difference between said actual printed locations and said intended locations for said markings, and said corrected locations for said markings being different from said intended locations for said markings by said first difference.

17. The method according to claim 15, said scanning device having a width that is wider than said item.

18. The method according to claim 15, said scanning device comprising a full-with array (FWA) scanner.

19. The method according to claim 15, said actual printed locations of said initial printed marks being relative to edges of said item.

20. The method according to claim 15, further comprising:

printing alignment marks in intended alignment mark locations on said item, using said marking device, said initial printed marks being distinct from said alignment marks; and comparing said locations of said alignment marks to said intended alignment mark locations to further identify said printing registration variation using said processor, said initial printed marks being printed by said marking device within a final print area, said alignment marks being outside said final print area in a trim area, and said trim area being removed from said final print area after printing on said item is complete.

* * * * *